United States Patent [19]
Frank et al.

[11] Patent Number: 5,182,862
[45] Date of Patent: Feb. 2, 1993

[54] INDICATING THREAD GAGE

[75] Inventors: Jimmy L. Frank, Houston; John R. Wolfe, Jr., Pasadena; James R. Douglas, Cypress, all of Tex.

[73] Assignee: Gagemaker, Inc., Pasadena, Tex.

[21] Appl. No.: 684,651

[22] Filed: Apr. 12, 1991

[51] Int. Cl.$^5$ .......................... G01B 5/08; G01B 5/12
[52] U.S. Cl. ...................................... 33/199 R; 33/829
[58] Field of Search ................... 33/199 R, 199 B, 829

[56] References Cited

U.S. PATENT DOCUMENTS

| | | |
|---|---|---|
| 1,925,346 | 9/1933 | Summers .......................... 33/199 R |
| 2,210,561 | 8/1940 | Allen et al. . |
| 2,512,863 | 6/1950 | Kapuczin . |
| 2,548,917 | 4/1951 | Spall . |
| 2,611,970 | 9/1952 | Johnson . |
| 2,725,637 | 12/1955 | Johnson . |
| 2,730,808 | 1/1956 | Johnson . |
| 2,849,804 | 9/1958 | Johnson . |
| 2,941,304 | 6/1960 | Man . |
| 2,943,394 | 7/1960 | Schabot . |
| 3,008,240 | 11/1961 | Johnson . |
| 3,217,419 | 11/1965 | Roth et al. . |
| 3,609,870 | 10/1971 | Johnson et al. . |
| 4,335,518 | 6/1982 | Reef . |
| 4,524,524 | 6/1985 | Frank et al. .................. 33/199 R X |
| 4,547,970 | 10/1985 | Brewster . |
| 4,553,337 | 11/1985 | Brewster . |
| 4,567,670 | 2/1986 | Roulstone . |
| 4,611,404 | 9/1986 | Arsenault . |
| 4,700,484 | 10/1987 | Frank et al. . |
| 4,821,422 | 4/1989 | Porter . |
| 4,947,555 | 8/1990 | Allen ................................. 33/199 R |

FOREIGN PATENT DOCUMENTS

| | | |
|---|---|---|
| 1100980 | 3/1961 | Fed. Rep. of Germany .... 33/199 R |
| 693670 | 7/1953 | United Kingdom ............. 33/199 R |

OTHER PUBLICATIONS

The Johnson Gage Company, "Indicating Thread Comparators for Taper Pipe Threads (Tri-Roll Type)".

Primary Examiner—Harry N. Haroian
Attorney, Agent, or Firm—Arnold, White & Durkee

[57] ABSTRACT

An improved indicating thread gage for gaging the functional fit and individual thread parameters of threaded products, especially taper threaded products. Thread form elements engage the threaded product and are capable of longitudinally traversing the threaded product while an indicator transduces radial displacement of the thread form element.

18 Claims, 6 Drawing Sheets

INDICATING THREAD GAGE

BACKGROUND OF THE INVENTION

1. Field of the Invention

This invention relates generally to gages for measuring the functional and individual parameters of threaded members. More specifically, the invention relates to an indicating thread gage for measuring the cumulative, functional parameters and the individual parameters of threaded members such as tubular products with tapered threads.

2. Description of the Related Art

Various components used in the oil and gas production industry are provided with threads at their ends to join one to another. These components include line pipe, casing, tubing, couplings, rotary joints, various equipment, and all other connections. The threads are usually tapered and the thread form may be conventional such as 8 round, buttress, or any other thread form used in the petroleum industry, including premium connections.

It is important for proper performance and extended service life of the threaded components that the joints between the various components be strong, durable, and tight. This requires that the threads used to form these joints be fabricated with precision. This is particularly important for tapered threads.

To obtain the high precision necessary for such connections, it is desirable that the thread sizes and configurations for threaded components used in the oil and gas production as well as other applications be standardized for the particular industry so that quality control can be uniformly maintained throughout the industry. In the oil and gas production industry, the American Petroleum Institute (API) has adopted specifications for threading, gaging and thread inspection of components used in the industry. For example, API specifications 5B and 7 set forth standard dimensions for pitch diameters, thread pitch, thread lead, taper, and other parameters for the various types and sizes of threads corresponding to a range of pipe and tubing diameters. These API specifications also set forth the gaging distance for particular threaded products. For example, API Std. 5B and API Spec. 7 specify the gaging distance for pipe and casing to be a certain distance (depending on nominal diameter) from the shoulder or face of the threaded product.

In addition to specifying the standard dimensions for the various thread parameters, the API specification also sets forth a procedure for checking the accuracy of the actual thread parameters of the threaded product as compared to the design dimensions. This procedure, which is universally accepted and used by the petroleum production industry, utilizes a series of ring and plug gages to check the accuracy of the actual thread against the API standard thread for the particular thread configuration and threaded product. This series of gages includes a plug and mating ring for each thread configuration covered by the API specification. These thread configurations vary by diameter, taper, pitch and type of thread, e.g., round or buttress. The number of thread configurations covered by the API specifications is large and the manufacturer desiring to fabricate all of these thread configurations therefore needs a like number of plug and mating ring pairs. This does not include the many non API thread forms now in use.

Further, the API specifications also require the manufacturer to have a set of working gages and to have access to a set of reference master gages. The working gages are used for actually gaging the product threads, while the reference master gages are used primarily to periodically check the accuracy of the working gages and only rarely to check the product threads. Because the rings and plugs are made of relatively expensive material and require substantial machining and grinding to very precise tolerances, a complete set of plugs and mating rings costs hundreds of thousands of dollars. Also, the threads of the rings and plugs eventually wear out from repeated use, necessitating replacement.

The thread parameters of tapered threads, unlike straight threads, are defined at a specific location on the thread. As discussed above, the API specifications list a gaging distance for each size of threaded product. The gaging distance defines a location on the thread a certain distance from an identifiable reference point such as a rotary shoulder, box end, or pin end. With ring or plug gages, the gage is threaded onto the product threads until hand tight engagement is achieved. Then, the so called "stand-off" distance of the ring or plug from the reference point is checked against the stand-off distance defined by the API specification. Standoff is defined as the distance from the reference point to a known point on the gage, usually a lip. The measured stand-off must fall within acceptable limits established by API for a particular threaded product. Thus, this gaging system is not capable of directly measuring individual thread parameters. It only provides a cumulative measurement of the individual parameters (i.e., functional diameter or fit) by a comparison between actual stand-off and reference stand-off.

As a result, the ring and plug gaging system established by API possess certain inherent shortcomings. As stated, rings and plugs do not directly measure individual thread parameters such as pitch diameter, thread pitch, lead, or taper. Ring and plug gages can measure only the functional fit of the threads. And, in fact, ring and plug gages can only accurately measure perfectly formed threads. If the threaded product is slightly oval shaped or slightly triangular shaped, the stand-off measurement obtained by ring and plug gages will not represent the true condition of the threads. Similarly, any error in pitch diameter, thread pitch, lead or taper will yield an erroneous stand-off measurement. Moreover, just because two threaded products pass the API ring and plug gage requirements, that does not mean that the two products will thread together properly. It is known in the industry for products that have passed the API ring and plug requirements not to pass requirements of torque-turn or torque position. In other words, during make-up of the threaded connection, the threaded products will require either too much or too little torque to engage a specified number of threads. Further, the stand-off of ring and plug gages are typically measured to a resolution of about one mil (0.001"). Still further, the accuracy attained by hand tight engagement of the ring or plug may be affected by any of the following: damage or distorted threads, improper thread form, incorrectly machine thread elements, ovality, cleanliness, or excessive lubrication which can affect the accuracy by as much as 0.100" or more. Finally, ring and plug gages are bulky, heavy and expensive.

Despite those shortcomings, ring and plug gages are the only API approved gaging system for measuring the functional fit of tapered threads. In contrast, there are a number of different gaging systems available for measuring both individual parameters and functional parameters of non-tapered or straight threads. For example, ANSI Standard B1.2-1983, entitled "Gages and Gaging for Unified Inch Screw Threads" provides for at least the following different gage systems for straight threads: split or solid threaded rings, thread snap gages, and indicating thread gages with either thread segments or thread rolls.

Indicating thread gages offer the advantages of offering a direct read-out of the thread parameter being measured, allowing a number of different sized threaded products to be measured with a single indicating thread gage, and the versatility to measure both functional parameters and individual thread parameters.

Others have attempted to provide an indicating gage using thread rolls or thread segments for tapered threads. For example, the Johnson Gage Company offers a "Tri-Roll Type" indicating thread comparator. However, this indicating gage is deficient insofar as it is incapable of gaging a threaded product at more than one circumferential position. Further, the Johnson gage is incapable of checking for ovality, or gaging the individual parameters of the thread form. Still further, the Johnson gage has a limited range of applicability to various sizes of threaded products, and the Johnson gage requires the use of an expensive and bulky ground reference master for calibration.

Thus, it has long been desired to develop an indicating gage capable of measuring both functional and individual thread parameters, having a wide range of applicability, and capable of replacing the API ring and plug gaging system.

SUMMARY OF THE INVENTION

The present invention relates to an indicating thread gage comprising an active block that is adapted to move in response to variations in the thread form of a threaded product, a fixed block, an indicator for transducing movement of the active block, an active arm with one end secured to the active block, a fixed arm with one end secured to the fixed block, a thread form element engaged with a section of the active arm not fixed in the active block, a second thread form element engaged with a section of the fixed arm not fixed in the fixed block, and each thread form element biased to a neutral position, but capable of movement along the threaded product. The active block can be adapted to slidably engage a guide rail and the fixed block can engage the guide rail as well. Additionally, a housing substantially surrounds the active block.

The active arm and fixed arm can be substantially planar, and the active arm and fixed arm are secured to the active block and fixed block, respectively, at an angle corresponding to the pitch of the thread to be gaged. Or, alternatively, the active arm and fixed arm are substantially non-planar, and the active arm and fixed arm are secured to the active block and fixed block, respectively, substantially perpendicular. The active block and the fixed block have a clocked surface for correctly orienting the substantially non-planar active arm and fixed arm.

The thread form element is adapted to engage the tapered thread for gaging the functional fit of the threads or can be adapted to engage the tapered thread substantially at the pitch diameter for making individual thread parameter measurements. A biasing means is provided for biasing the active block to a neutral position. A brace can be provided to enhance the rigidity of the indicating thread gage, and the indicator is a dial gage, and wear pads are provided for contacting the tubular product.

DESCRIPTION OF THE PREFERRED EMBODIMENTS

Figure 1:
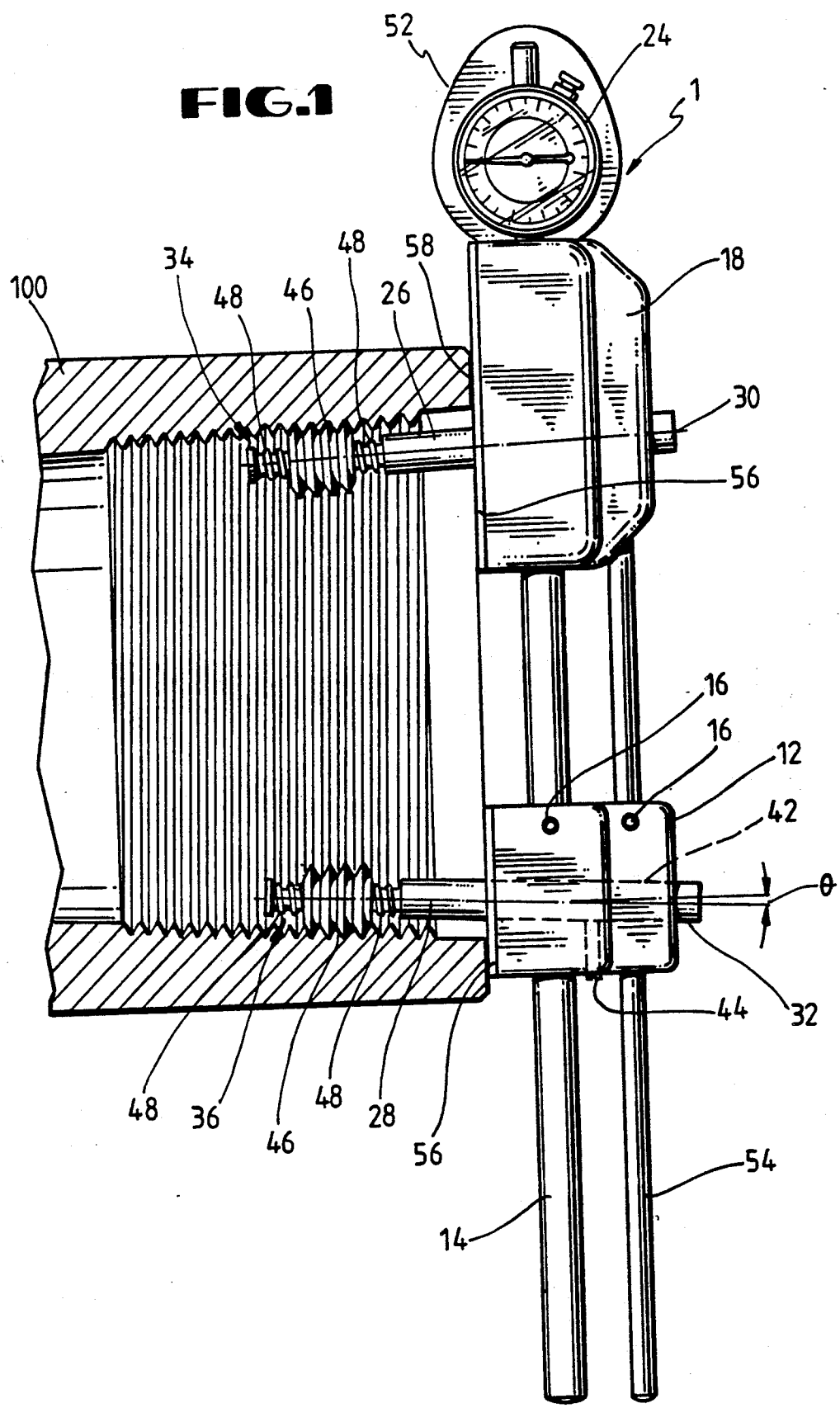
FIG. 1 shows a side view of the present invention gaging internal threads of a tubular product.
Figure 2:
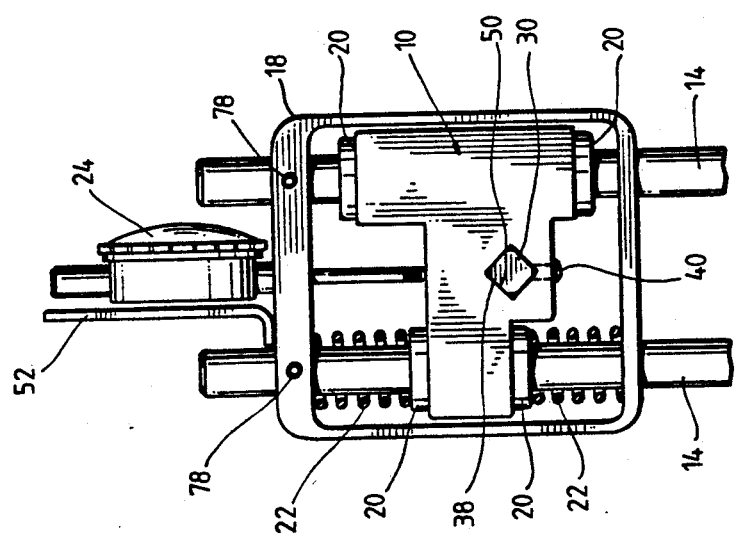
FIG. 2 shows a front view of the active block area of the present invention.

As shown in FIGS. 1 & 2, the present invention utilizes an active block 10 and a fixed block 12 mounted on a guide rail 14. The guide rail 14 can be made of any material suitable to withstand sliding and clamping forces, and, in a preferred embodiment, consists of two cylindrical hardened and polished metal rods.

The fixed block 12 has apertures therein for receiving the guide rails 14. The fixed block 12 utilizes set screws 16 or other clamping mechanisms for locating the fixed block 12 at a given location along the guide rails 14. The set screws 16 react directly against the guide rails 14. Other clamping mechanisms may simply increase or decrease, as appropriate, the circumferential clamping force of the fixed block 12 upon the guide rails 14.

Located toward one end of the guide rails 14 is the active block 10. Unlike the fixed block 12, the active block 10 is adapted to slide freely along the guide rail 14 within a limited range. This is accomplished by the use of a housing 18 fixed by set screws 78 at or near one end of the guide rails 14 in which the active block 10 is located. As can be seen from FIG. 2, the active block 10 is actually located within the housing 18. The active block 10 is allowed to freely slide along the guide rails 14 within the housing 18 by means of bearings 20 or other means suitable for increasing the slidability of the active block 10 or suitable for reducing the coefficient of friction between the active block 10 and the guide rail 14. In a preferred embodiment, the bearings 20 are recirculating linear bearings.

The active block 10 is held in a neutral position by active block springs 22. It will be understood that the active block springs 22 provide a biasing force to hold the active block 10 in its neutral position. Other biasing means are available to accomplish this same purpose, and are well known to those skilled in the art.

An indicator gage 24 is attached to the housing 18 and is capable of indicating the movement of the active block 10 as it slides along the guide rails 14. The indicating gage 24 can be a dial gage or any other device capable of transducing linear movement. Other indicator gages suitable for this purpose would include a linear variable differential transducer (LVDT) connected to a digital read-out.

The active block 10 has associated therewith an active arm 26. Likewise, the fixed block 12 has associated therewith a fixed arm 28. Each arm 26, 28 has a fixed end 30, 32, respectively, and a free end 34, 36, respectively. The fixed end 30 of the active arm 26 is fixedly engaged to the active block 10 by means of an active arm guide 38. The active arm 26 is held securely in the active arm guide 38 by means of set screws 40 or some other clamping mechanism. The active arm 26 may be removed from the active block 10 by loosening the set screws 40. Similarly, the fixed arm 28 is held securely in the fixed block 12 by means of a fixed arm guide 42 and a holding clamp 44 or other suitable engaging mechanism.

The free ends 34 and 36 of the active arm 26 and fixed arm 28 are each adapted to receive a thread form element 46 such that the thread form element 46 is biased to remain in a neutral position along the arms 26 and 28, but can also slide along the length of the arms. The thread form element 46 can be a thread roll or thread segment which can rotate the arms 26 and 28. In a preferred embodiment, the active arm 26 has a section of reduced diameter toward the free end 34. A thread form element 46 such as a thread roll engages this reduced diameter section and is able to slide longitudinal along the reduced section as well as rotate. The thread form element 46 is biased in a neutral position in the reduced diameter section by means of active arm springs 48. The fixed arm 28 has a similarly reduced diameter section near the free end 36. A similar thread form element 46 also slidably engages this region using arm springs 48. The fixed block 12 can also be adapted to accommodate a second fixed arm 28 and thread form element 46 thus giving an indicator gage with three thread form elements.

Figure 3:
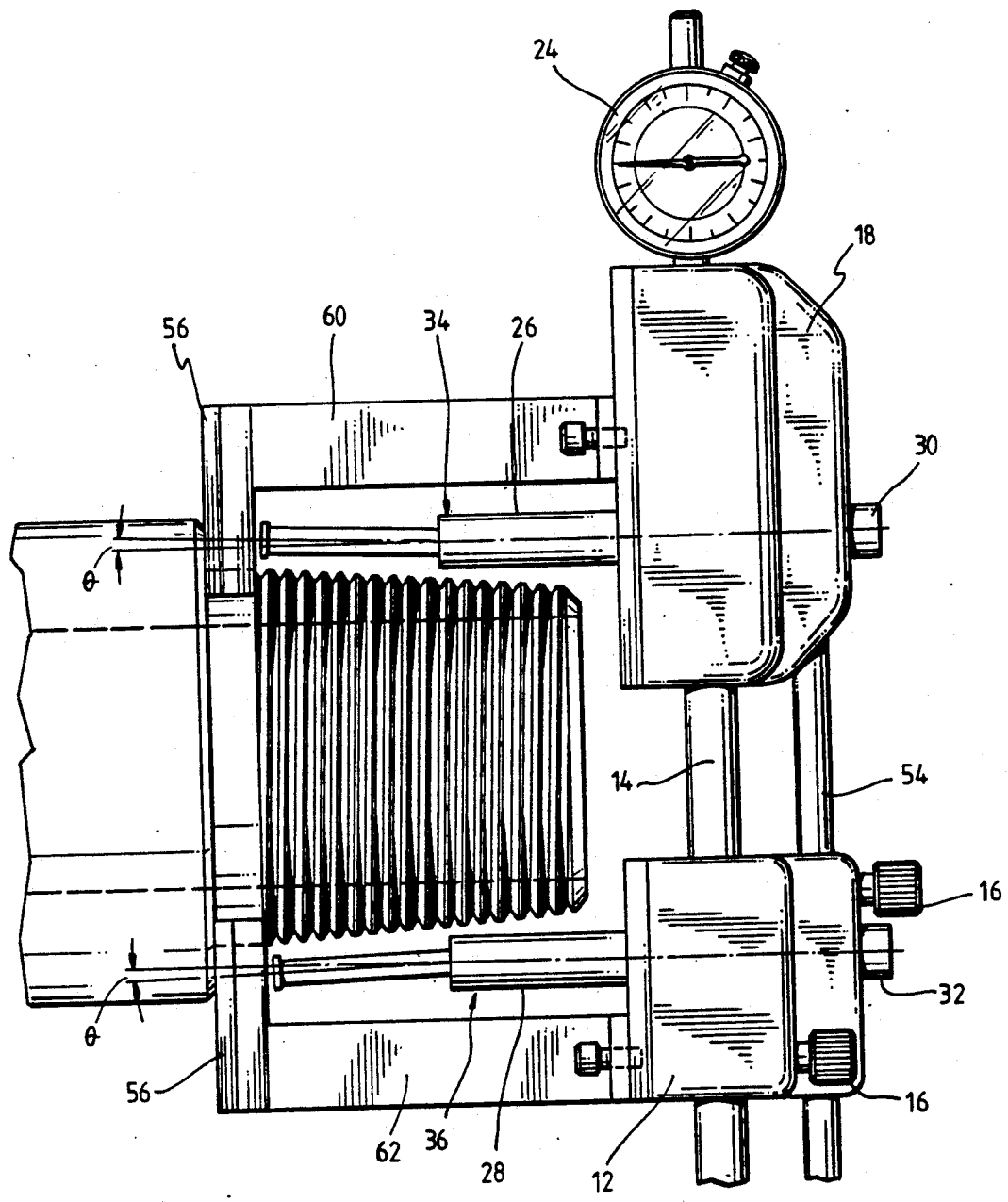
FIG. 3 shows a side view of the present invention gaging the external threads of a drill pipe.

Referring now to FIG. 3, it can be seen that both the active arm 26 and the fixed arm 28 are substantially non-planar. The following discussion will refer specifically to the active arm 26, however, it will be understood that it applies equally to the fixed arm 28. The portion of the active arm 26 that extends beyond the active block housing 10 is referred to as the free end section 34 of the active arm 26. As shown in FIG. 3, at some point in the free end section 34 of active arm 26, the active arm deviates from the longitudinal axis formed by the fixed end 30 of the active arm 26. The free end of the active arm 26 is canted at an angle Theta (Θ) to the longitudinal axis of the fixed end 30 of the active arm 26. It will be understood by those skilled in the art that this angle Theta (Θ) is the angle necessary to present the thread roll 46 in a substantially parallel relationship with the taper of the threaded product to be measured. For API pipe with 8 round threads, theta is approximately 1.789 degrees.

The fixed end of the active arm 26, as shown in FIG. 2, has a clocked surface 50 consisting of two ground surfaces. The purpose of this clocked surface 50 is to mate with the corresponding clocked surface in the active arm guide 38. The clocked surface 50 and the mating clocked surface in the active arm guide 38 are necessary to maintain the correct orientation of the substantially non-planar active arm 26 with the threaded product to be measured.

It will also be appreciated that both the active arm 26 and the fixed arm 28 can be substantially planar as shown in FIG. 1. In this second embodiment, the active arm guide 38 must be substantially non-planar (or canted) at the correct angle Theta (Θ) inside the active block in order to provide the thread form element 46 in the correct orientation. Although this discussion has centered around the active arm 26, it is to be understood that it applies to the fixed arm 28 and related components equally. Those skilled in the art will appreciate, based on this disclosure, that an indicating thread gage according to the present invention can make use of canted active and fixed arms as shown in FIG. 3; or substantially planar active and fixed arms as shown in FIG. 1; or a combination of canted and substantially planar arms (not shown).

Based on this disclosure, those skilled in the art will appreciate that the indicating gage of the present invention can be adapted as a dedicated gage to measure one specific size and form of thread, or, as described above, can be used as an adjustable gage capable of measuring a wide range of product sizes and thread forms. Different size products and thread forms can be measured with the present invention by merely utilizing the correct active arm 26, fixed arm 28 and thread form elements 46.

It will also be appreciated those having benefit of this disclosure that the present invention can be adapted to be a fixture on a threading machine such as a lathe. The present invention can be used periodically during the machining of the threads to ensure that the threads are cut to specification.

Those skilled in the art having benefit of this disclosure will also appreciate that the present invention can be adapted to utilize two active block/arm assemblies, instead of one active block/arm and one fixed block/arm. In this embodiment of the present invention, the first and second active block/arm assembly can be positioned anywhere along the guide rail 14 by loosening housing set screws 78 and moving the assembly into the desired location. Each active block/arm assembly has an indicator 24 which is preferably an LVDT. Each LVDT would communicate with a digital or analog display and register the total differential movement between the active block/arm assemblies. Also, in this embodiment either of the active block/arm assemblies can be locked down to function as a fixed block/arm assembly.

Figure 4:
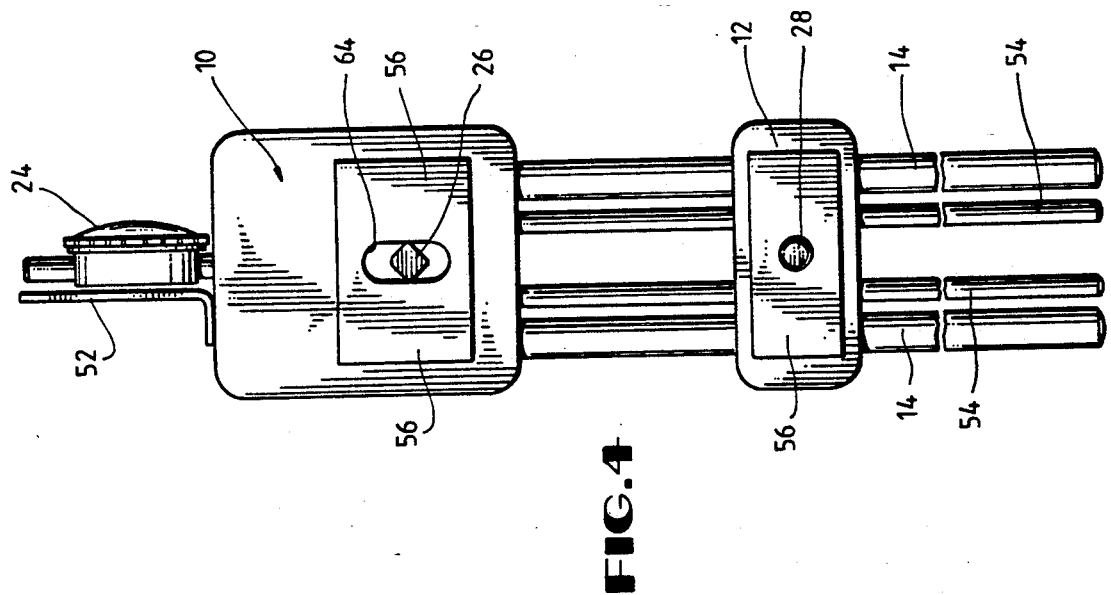
FIG. 4 shows a front view of the present invention.

Referring now to FIG. 4, it can be seen that active block 10 and fixed block 12 are provided with wear pads 56 for contacting the threaded member as shown in FIG. 1. These wear pads can be fabricated from any suitable wear-resistant material, e.g., tool steel or tungsten carbide. FIG. 4 shows the location of the wear pads 56 on the active and fixed block, 10, 12, for purposes of measuring the internal or external threads on products such as line pipe or casing. For gaging the external threads of drill pipe, extender arms 60, 62 can be attached to the active and fixed blocks, respectively, 10, 12 as shown in FIG. 3. The reference point for measuring the gaging distance for externally threaded drill pipe is the rotary shoulder at the back of the threaded portion.

Figure 5:
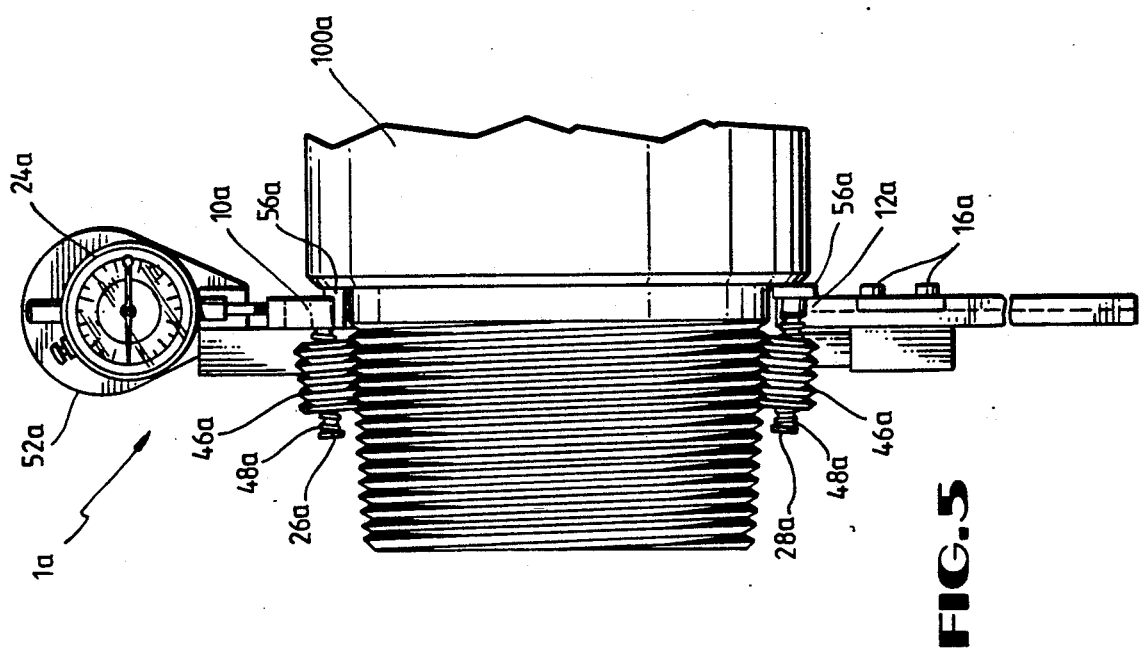
FIG. 5 shows an alternate embodiment of the present invention.

An alternate embodiment of the present invention for gaging the external threads on API drill pipe is shown in FIG. 5. In FIG. 5, indicating thread gage 1a is shown to have a "c" shaped configuration. Set screws 16a lock the fixed block 12a into position. Active block 10a is hinged to travel in an arc away from and toward the fixed block 12a. The active block 10a is biased to a neutral position by means of a biasing spring (not shown). An indicator gage 24a transduces the movement of the active block. Both the active block 10a and the fixed block 12a are adapted to receive an active arm 26a and a fixed arm 28a, respectively, as discussed above. Wear pads 56a are attached to the indicator gage 1a for contacting the rotary shoulder of drill pipe.

Referring back to FIG. 4, an aperture 64 is shown in the housing 18 to allow the active arm 10 to freely slide upon the guide rails 14. An indicator guard 52 is provided for protecting the indicator gage 20, also braces 54 can be provided in order to provide a more rigid indicating gage.

The following discussion will focus on the use of the present invention with tubular products. It will be appreciated that this invention is not limited to use with tubular products, but can be used with any threaded product. In use, the indicating thread gage 1 is outfitted with the correct active arm 26 and fixed arm 28 for the particular threaded product to be measured. As discussed, the active arm and fixed arm can be substantially planar or substantially non-planar. Set screws 16 on the fixed block 12 are loosened and the fixed block 12 moved into a nominal position based on the diameter of the tubular product to be measured. Set screws 16 are then tightened down to fixedly engage the fixed block 12 with the guide rails 14 and braces 54.

A calibrating standard (not shown) that represents the correct individual thread parameters and functional parameters is used to zero the indicator gage 24 as is known in the art. The calibrating standard can be a fixed standard such as a reference master ring or plug or, preferably, an adjustable calibrating standard capable of calibrating the invention for a variety of thread forms and sizes.

Once the indicator gage 24 has been zeroed, the active arm 22 is moved in a direction along guide rail 14 against the active block spring 22 to facilitate the removal of the indicating thread gage 1 from the calibration standard. The indicating thread gage 1 is then placed over or into (as appropriate) the threaded product to be measured as shown in FIGS. 1 and 3. For example, when gaging the threads of a box end, the active arm 26 will be moved in a direction along the guide rails 14 in a direction toward the fixed block 12. The active arm 26 is held in this position until the indicating thread gage 1 is inserted into the box end, such that the wear pads 56 are brought into contact with the box end. As discussed above, API defines a reference surface from which all tapered thread measurements are to be made. For box ends, the reference surface is the end surface of the box 58. Once the wear pads 56 contact the reference surface 58, the active arm is released and allowed to engage the threads.

At this point, thread form elements 46 are in mating engagement with the threaded product at substantially the gaging distance specified for measuring the functional and individual parameters of the threaded product 100 according to API. The thread indicating gage 1 can be rotated through one or more complete 360° circle with measurements being taken as desired from the indicator gage 24. It will be appreciated that as the indicator gage is rotated, the thread form elements 46 travel longitudinally along the reduced diameter section of their respective arm against the biasing springs 48.

Because the present invention is capable of making multiple measurements around the circumference of the threaded product at substantially the recommended gaging distance, the present invention overcomes many of the limitations of the prior art systems. Indeed, because of the ability of the present invention to make multiple circumferential measurements at any location along the thread form, the present invention can be used to match threaded products together so that during make-up of the connection, torque-turn or torque position requirements will be met.

Figure 6:
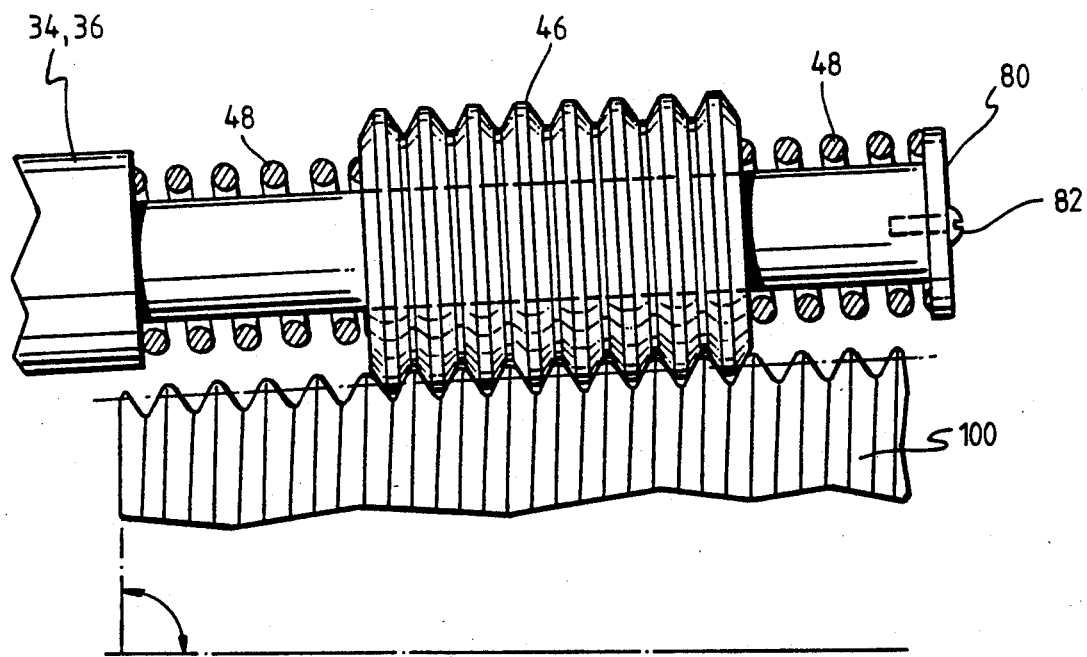
FIG. 6 shows an 8 round thread form element mating with an 8 round threaded product.

It will also be appreciated that the type of measurement made by the indicating thread gage 1 will depend on the type of thread form element 46 used. For example, a measurement of the functional thread parameter can be made by using a thread roll or segment substantially as shown in FIG. 6. There, thread roll 46 has a thread profile that allows contact with a perfectly formed 8 round thread 100 along the pitch diameter line. The longitudinal length of the thread roll 46 can be varied from substantially the length of the threaded member to just a few threads. It will be appreciated by those skilled in the art that this type of thread roll will give an indication not only of variations in pitch diameter but also variations in lead, taper and thread form. Thus, while not resolving individual errors in these parameters, it will give an indication of the cumulative error or functional fit of the threaded product. FIG. 6 also shows cap 80 and screw 82 which allow retrofitting of the thread form element 46 and springs 48. The cap 80 and screw 82 also hold the thread form element 46 and springs 48 in position during use.

Those skilled in the art having benefit of this disclosure will appreciate the benefit to be realized by instrumenting the active arm, fixed arm, or both and that the longitudinal movement of the thread form element 46 along the arm is transduced. This can be accomplished by use of an LVDT in each arm. The information gleaned from transducing the movement of the thread form element 46 can be used for measurements such as thread lead.

Figure 7:
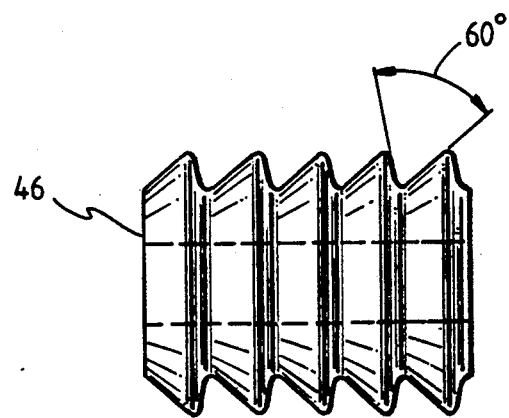
FIG. 7 shows the relationship of the thread forms on the thread form element.

A preferred embodiment of the thread form element 46 is shown in FIG. 7. It is known in the art that the individual threads on a threaded product are normal to the threaded product axis as shown in FIG. 6 even though the threads are tapered. The thread forms on thread form element 46 are also normal to threaded product axis when the thread form element 46 is in mating engagement with the threaded product. However, as shown in FIG. 7, the preferred embodiment of the thread form element 46 has individual thread forms that are not normal to the thread form element 46 axis. For threads with an included flank angle of 60°, a line bisecting an individual thread form such that the thread form flanks are 30° on either side of the bisecting line will form an angle of approximately 88.211° with the longitudinal axis of the thread form element 46. Expressing this relationship in another way, the thread form flanks are approximately 28.21° and 31.79° off a line normal to the thread form element 46 axis.

Figure 8A:
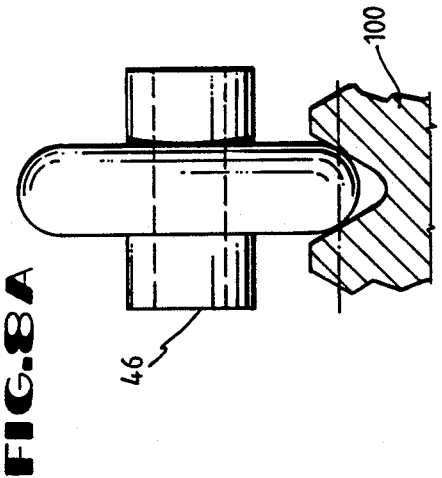
FIGS. 8a and 8b show thread form elements for gaging the pitch diameter of a threaded product.
Figure 8B:
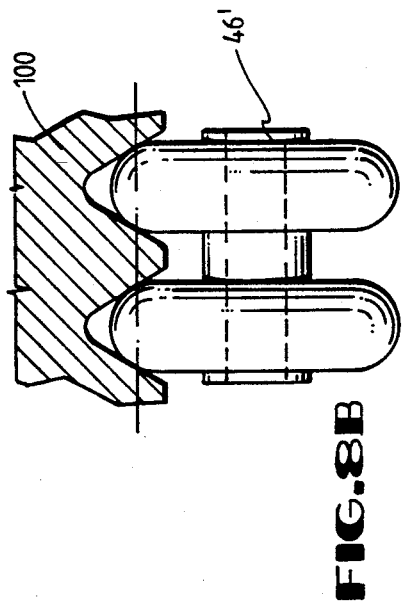

FIGS. 8a and 8b show thread rolls 46 and 46' capable of measuring the individual thread parameter of pitch diameter. As will be appreciated by those skilled in the art, various thread rolls 46 can be fabricated to test for the individual thread parameters that need to be measured.

Figure 9:
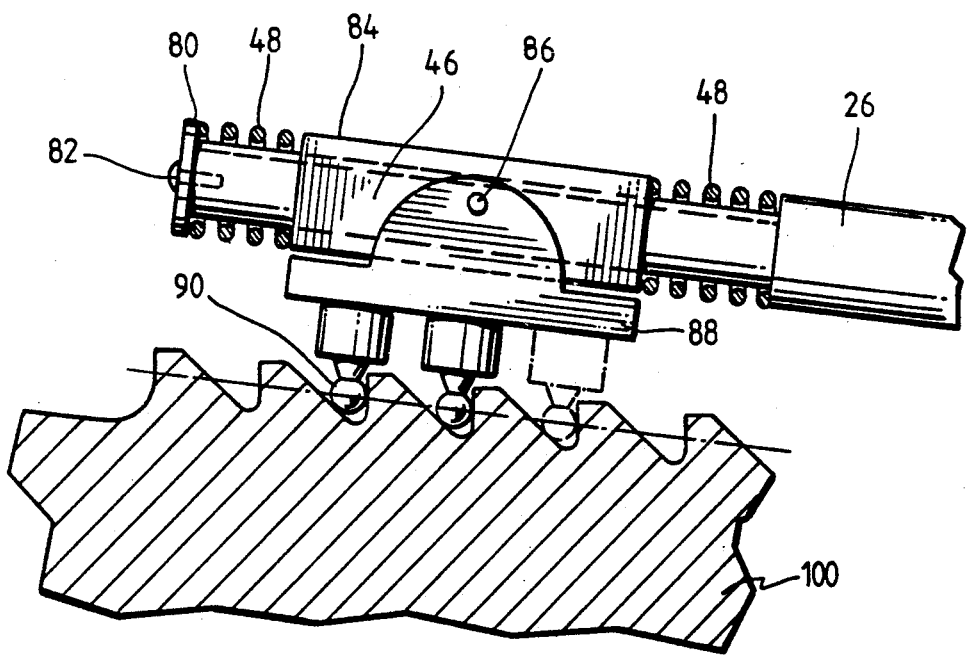
FIG. 9 shows an alternate embodiment of the thread form element.

FIG. 9 shows an additional embodiment of the present invention wherein the thread form element 46 consists of a carrier 84 and a platform 88. Typically, the carrier 84 is a tubular sleeve adapted to slide on the free end of either the active arm 26 or fixed arm 28. The platform 88 is hinged to the carrier by pin 86. This hinge arrangement allows the platform and thread gaging pieces 90 to pivot about the pin 86. Those skilled in the art benefitting of this disclosure will appreciate that this arrangement allows the use of substantially planar arms 26 & 28 and yet does not require that the active block 10 or fixed block 12 be canted at the appropriate angle. In other words, because the platform is hinged, the thread gaging elements 90 will contact the threaded product at the correct taper angle. The free end of the arm is typically grooved (not shown) and a corresponding tongue (not shown) is provided in the carrier 84 to aligned the thread form element in the correct orientation. Those skilled in the art having the benefit of this disclosure will appreciate that other additional embodiments of the present invention are possible. Such as fixing the carrier 84 to the arm and adapting the platform or thread gaging elements to move back and forth along the longitudinal axis of the threaded member.

Figure 10:
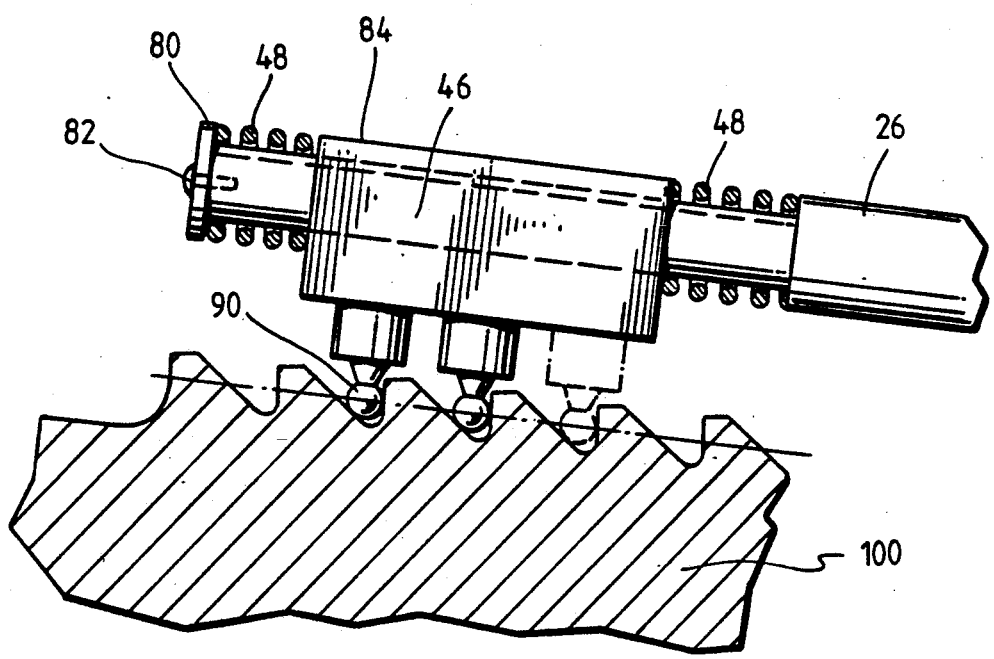
FIG. 10 shows an alternate embodiment of the thread form element.

FIG. 10 shows an alternate embodiment of a thread form element similar to that shown in FIG. 9. The thread form element in FIG. 10 is not hinged between the carrier 84 and the platform 88. Thus, the taper of the threaded product must be accounted for either by canted arms or by a canted block, as disclosed above.

The foregoing disclosure will enable those of skill in the art to practice the preferred embodiment of the present invention. It will be appreciated that there are other embodiments of the present invention.

What we claim is:

1. An indicating thread gage for tapered threads comprising:
    an active block slidably engaged to a guide rail passing therethrough;
    a biasing means for biasing the active block to a neutral position;
    a fixed block engaged to the guide rail passing therethrough;
    an indicator for transducing movement of the active block along the guide rail;
    an active arm with one end secured to the active block;
    a fixed arm with one end secured to the fixed block; and
    a thread form element engaged with a section of the active arm not fixed in the active block;
    a second thread form element engaged with a section of the fixed arm not fixed in the fixed block;
    each thread form element biased to a neutral position, but capable of sliding movement along the active arm and fixed arm, respectively.

2. The apparatus of claim 1 further comprising a housing in which substantially surrounds the active block.

3. The apparatus of claim 1 wherein the active arm and fixed arm are substantially planar, and the active arm and fixed arm are secured to the active block and fixed block, respectively, at an angle corresponding to the pitch of the thread to be gaged.

4. The apparatus of claim 1 wherein the active arm and fixed arm are substantially non-planar, and the active arm and fixed arm are secured to the active block and fixed block, respectively, substantially perpendicular.

5. The apparatus of claim 4 further comprising a clocked surface on the active block and on the fixed block for correctly orienting the active arm and fixed arm, respectively.

6. The apparatus of claim 3 or 5 wherein the indicating gage is a fixed gage for measuring a single size of thread.

7. The apparatus of claim 3 or 5 wherein the indicating gage is an adjustable gage for measuring a plurality of types of threaded products.

8. The apparatus of claim 1 wherein the thread form element is adapted to engage the tapered thread for gaging the functional fit of the threads.

9. The apparatus of claim 1 wherein the thread form element is adapted to engage the tapered thread substantially at the pitch diameter for making individual thread parameter measurements.

10. The apparatus of claim 1 further comprising a brace to enhance the rigidity of the indicating thread gage.

11. The apparatus of claim 1 wherein the indicator is a dial gage.

12. An indicating thread gage for gaging tapered threads comprising:
    an active block slidably engaged with a guide rail passing through the active block, said active block biased to a neutral position along the guide rail, said active block having a wear pad for contacting with a threaded product;
    a fixed block engaged to the guide rail passing through the fixed block, said fixed block also having a wear pad for contacting with the threaded product;
    an active arm with one end secured to the active block;
    an indicator for transducing movement of the active block and active arm in response to variations in the tapered thread;
    a fixed arm with one end secured to the fixed block;
    a thread form element capable of mating with the tapered thread and engaged with a section of the active arm not fixed in the active block;
    a second thread form element capable of mating with the tapered thread and engaged with a section of the fixed arm not fixed in the fixed block;
    each thread form element biased to a neutral position, but capable of movement along the active arm and fixed arm, respectively.

13. The apparatus of claim 12 wherein the wear pads are mounted to extender arms which are attached to the active block and fixed block.

14. The apparatus of claim 12 wherein the active arm and fixed arm are substantially planar, and the active arm and fixed arm are secured to the active block and fixed block, respectively, at an angle corresponding to the taper of the threaded product.

15. The apparatus of claim 12 wherein the active arm and fixed arm are substantially non-planar, and the active arm and fixed arm are secured to the active block and fixed block, respectively, substantially perpendicular.

16. The apparatus of claim 15 further comprising a clocked surface on the active block and on the fixed block for correctly orienting the active arm and fixed arm, respectively.

17. An indicating thread gage comprising:
    an active block adapted to move in response to variations in a threaded product;

a biasing means for biasing the active block to a neutral position;
a fixed block;
an indicator for transducing movement of the active block;
an active arm with one end secured to the active block;
a fixed arm with one end secured to the fixed block;
a thread form element engaged with a section of the active arm not fixed in the active block;
a second thread form element engaged with a section of the fixed arm not fixed in the fixed block;
each thread form element biased to a neutral position, but capable of movement along a threaded product.

18. An indicating thread gage comprising:
first and second blocks engaged to a guide rail, at least one of the first and second blocks biased to a neutral position;
an indicator for transducing movement of at least one of the first and second blocks along the guide rail;
a first arm with one end secured to the first block;
a second arm with one end secured to the second block;
a first thread form element engaged with the first arm;
a second thread form element engaged with the second arm;
each thread form element biased to a neutral position and slidable along its respective arm.

* * * * *